Dec. 31, 1957  G. E. MORTON  2,817,864
TABLE FORK CLEANER
Filed July 16, 1954
Fig. 1.
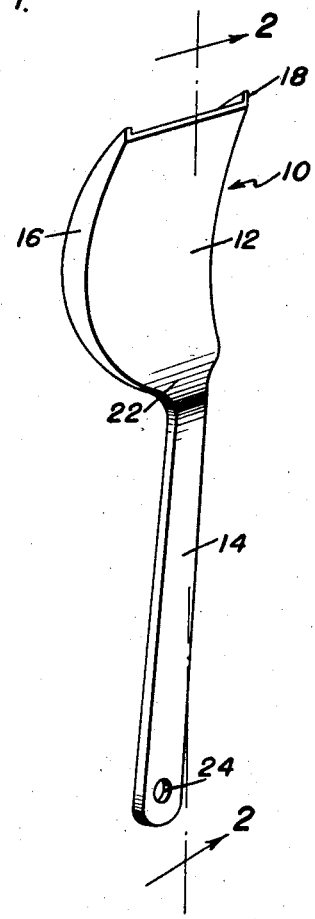
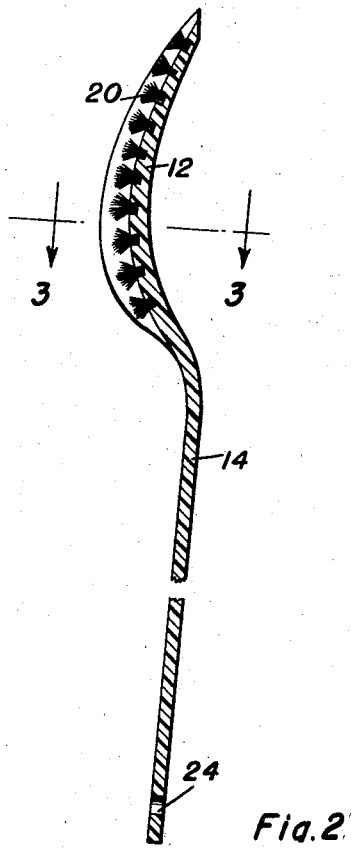
Fig. 2.
Fig. 3.
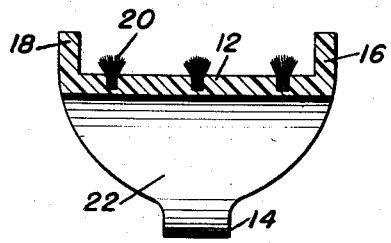
Gordon E. Morton
INVENTOR.
BY *Clarence A. O'Brien*
*and Harvey B. Jackson*
Attorneys

United States Patent Office 2,817,864
Patented Dec. 31, 1957

2,817,864

TABLE FORK CLEANER

Gordon E. Morton, Everett, Wash.

Application July 16, 1954, Serial No. 443,774

1 Claim. (Cl. 15—111)

The present invention relates to a kitchen utensil and more particularly relates to a novel brush for scraping and cleaning forks and similar utensils having spaced tines.

The primary object of the invention is to provide a device for efficiently cleaning, scouring, and polishing forks, and the like, which is particularly advantageous for cleaning material from the interstitial space between the tines of the utensil to be cleaned.

A further object of the invention is in the provision of a fork cleaning utensil which will effectively remove material from the interstitial spaces between the tines of the fork adjacent the connection of the tines to the base of the fork at the fork handle, which cleaning device is in itself easy to maintain and clean and which device is capable of extreme ease of manipulation in performing its cleaning functions.

A still further object of the invention is in the provision of a device for cleaning forks and the like, which device has a brush head curved substantially to conform to the curve of the tines of the fork with longitudinal rows of bristles spaced transversely across the head of the device.

These, together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view of the fork cleaning device constituting the invention;

Figure 2 is a cross-sectional view of the device taken substantially along the plane of section line 2—2 of Figure 1; and Figure 3 is a cross-sectional view of the head of the device taken substantially along the plane of section line 3—3 of Figure 2.

In the drawings, the cleaning device is indicated in its entirety by the reference numeral 10, the device comprising an arcuate supporting plate or head 12 which has integrally formed therewith a handle 14, extending outwardly from one end of the head. Obviously, however, if desired, the handle 14 may be formed from a separate element and secured to the end of the head 12 without departing from the spirit of the invention. As a practical matter it is advantageous to form the handle 14 integral with the head 12 whereby the entire unit may be molded or stamped or cast as a one-piece unit.

The head 12 is in the shape of a unitary plate which is curved or arcuated from end to end. The concave side of the plate is preferably formed as a smooth, plain surface.

The side edges of the plate are provided with parallel guides 16 and 18 which extend from these side edges at right angles to the plate 12 away from the concave side of the plate to form guides along the side edges of the convex side of the plate.

The guides 16 and 18 are formed integrally on the side edges of the plates 12 and are suitably arcuated along their free edges to guide the tines of a fork between the series of transversely spaced, longitudinal rows of brushes 20 attached to the convex side of the plate 12 in any convenient manner.

At the end adjacent its connection to the handle 14, the plate 12 converges into a small end portion 22 and the guides 16 and 18 are smoothly contoured to terminate short of this converging portion so that some free space will remain for freedom of movement of the brushhead in relation to the fork in order to properly reciprocate and agitate the brushes in the interstitial spaces between the tines of the fork being cleaned. The convex shape of the one side surface of the plate 12 is preferably slightly greater than the normal curve of the tines of a fork so that the fork may be passed over this convex surface between the guides 16 and 18 of the plate in such a manner that the brushes 20 will positively clean the interstitial spaces between the tines of the fork.

The end of the plate 12 opposite end portion 22 terminates in a scraper having a sharp tip as can be seen in Fig. 2. This scraper may obviously be used separately or together with brush bristles 20 to move effectively clean fork tines.

As a convenience in hanging up the cleaning device 10, the outer end portion of the handle 14 is provided with an aperture 24 for suspending the device from a nail, hook, or the like, when not in use.

From the foregoing description, the construction and utilization of the fork cleaner constituting the invention is believed to be readily apparent. However, since numerous modifications will readily occur to those skilled in the art, it is not desired to limit the invention to the exact construction shown and described, and accordingly all suitable modifications and equivalents may be resorted to, falling within the scope of the appended claim.

What is claimed as new is as follows:

A table fork cleaner comprising an elongated solid plate for reciprocation endwise along the tines of a table fork and having a handle on one end for reciprocating the same, said plate being wider than the tine end of a fork and longitudinally curved to provide a convex face thereon for fitting substantially in the concave sides of all the tines and bridging the spaces between the tines, said plate being provided with a pair of longitudinal flanges on the side edges thereof extending at right angles from said convex face and spaced apart to receive the tines of a fork therebetween for guiding said plate during reciprocation along said tines, and longitudinal rows of cleaner bristles fixed in said plate and projecting from said convex face between said flanges in spaced relation thereto for cleaning said tines in response to reciprocation of said plate, the other end of said plate being of a width to extend across the tines of a fork for scraping the tines upon movement of said plate in one direction along said tines.

References Cited in the file of this patent

UNITED STATES PATENTS

| 485,048 | Lehmann | Oct. 25, 1892 |
| 1,876,284 | Fried | Sept. 6, 1932 |
| 2,146,075 | Kirsch | Feb. 7, 1939 |
| 2,183,139 | Hertzberg | Dec. 12, 1939 |
| 2,677,840 | Morton | May 11, 1954 |
| 2,689,968 | Rissler | Sept. 28, 1954 |

FOREIGN PATENTS

| 280,145 | Italy | Nov. 29, 1930 |